(12) United States Patent
Doemling et al.

(10) Patent No.: US 11,216,951 B2
(45) Date of Patent: Jan. 4, 2022

(54) METHOD AND APPARATUS FOR REPRESENTING ENVIRONMENTAL ELEMENTS, SYSTEM, AND VEHICLE/ROBOT

(71) Applicant: Bayerische Motoren Werke Aktiengesellschaft, Munich (DE)

(72) Inventors: Maximilian Doemling, Shanghai (CN); Sebastian Granzow, Kirchheim (DE); Wanli Jiang, Shanghai (CN); Qianshan Li, Shanghai (CN); Jianpeng Li, Suzhou (CN); Shuhan Lv, Shanghai (CN); Hongshan Xu, Shanghai (CN); Tao Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 16/693,161

(22) Filed: Nov. 22, 2019

(65) Prior Publication Data
US 2020/0090339 A1 Mar. 19, 2020

Related U.S. Application Data

(63) Continuation of application No. PCT/CN2017/085817, filed on May 25, 2017.

(51) Int. Cl.
G06T 7/143 (2017.01)
G06T 7/187 (2017.01)
(Continued)

(52) U.S. Cl.
CPC ............ G06T 7/143 (2017.01); G06T 7/11 (2017.01); G06T 7/187 (2017.01); G06T 7/60 (2013.01);
(Continued)

(58) Field of Classification Search
CPC . G06T 7/143; G06T 7/187; G06T 7/11; G06T 7/60; G06T 17/005; G06T 17/05; G06T 2207/10028; G06T 2207/30252
See application file for complete search history.

(56) References Cited

U.S. PATENT DOCUMENTS

2009/0154791 A1   6/2009  Yoon et al.
2011/0282581 A1* 11/2011  Zeng ................. G01S 7/4808
                                                    701/301
(Continued)

FOREIGN PATENT DOCUMENTS

CN   102831646 A   12/2012
CN   103500338 A    1/2014
(Continued)

OTHER PUBLICATIONS

Lu, Xiaohu, et al. "Pairwise Linkage for Point Cloud Segmentation." ISPRS Annals of Photogrammetry, Remote Sensing & Spatial Information Sciences 3.3 (2016). (Year: 2016).*
(Continued)

Primary Examiner — Xin Sheng
(74) Attorney, Agent, or Firm — Crowell & Moring LLP

(57) ABSTRACT

A computer-implemented method for representing environmental elements includes receiving scan data comprising at least a point cloud representing at least an environmental element from a sensor, segmenting the point cloud into point clusters, and partitioning the point clusters into hierarchical grids. The method also includes establishing a Gaussian distribution for points in each cell of each of the hierarchical grids, and constructing a Gaussian Mixture Model based on the Gaussian distribution for representing the environmental element.

13 Claims, 6 Drawing Sheets

(51) Int. Cl.
- *G06T 7/11* (2017.01)
- *G06T 7/60* (2017.01)
- *G06T 17/00* (2006.01)
- *G06T 17/05* (2011.01)

(52) U.S. Cl.
CPC ............ *G06T 17/005* (2013.01); *G06T 17/05* (2013.01); *G06T 2207/10028* (2013.01); *G06T 2207/30252* (2013.01)

(56) References Cited

U.S. PATENT DOCUMENTS

| | | | |
|---|---|---|---|
| 2011/0317922 | A1 | 12/2011 | Chertok et al. |
| 2013/0089259 | A1* | 4/2013 | Cha ............ G06T 7/11 382/173 |
| 2014/0267262 | A1* | 9/2014 | Masry ............ G06T 17/20 345/423 |
| 2018/0260616 | A1* | 9/2018 | Spinoulas ............ G06K 9/00 |

FOREIGN PATENT DOCUMENTS

| | | |
|---|---|---|
| CN | 103711050 A | 4/2014 |
| CN | 104764457 A | 7/2015 |
| DE | 10 2016 011 378 A1 | 4/2017 |

OTHER PUBLICATIONS

Woo, H., et al. "A new segmentation method for point cloud data." International Journal of Machine Tools and Manufacture 42.2 (2002): 167-178. (Year: 2002).*

Choe, Yungeun, Seunguk Ahn, and Myung Jin Chung. "Online urban object recognition in point clouds using consecutive point information for urban robotic missions." Robotics and Autonomous Systems 62.8 (2014): 1130-1152. (Year: 2014).*

Yokoya, Naokazu, and Martin D. Levine. "Range image segmentation based on differential geometry: A hybrid approach." IEEE Transactions on Pattern Analysis and Machine Intelligence 11.6 (1989): 643-649. (Year: 1989).*

PCT/CN2017/085817, International Search Report dated Feb. 26, 2018 (Two (2) pages).

Das et al., "Scan Registration using Segmented Region Growing NDT", *The International Journal of Robotics Research* 33.13 (2014) fifteen (15) total pages.

Ulaş et al. "3D Multi-Layered Normal Distribution Transform for Fast and Long Range Scan Matching", *Journal of Intelligent & Robotic Systems* 71.1 (2013) twenty five (25) total pages.

* cited by examiner

METHOD AND APPARATUS FOR REPRESENTING ENVIRONMENTAL ELEMENTS, SYSTEM, AND VEHICLE/ROBOT

CROSS REFERENCE TO RELATED APPLICATION

This application is a continuation of PCT International Application No. PCT/CN2017/085817, filed May 25, 2017, the entire disclosure of which is herein expressly incorporated by reference.

BACKGROUND AND SUMMARY OF THE INVENTION

The present invention relates in general to the field of vehicle/robot localization, and in more particular, to a method and an apparatus for representing environmental elements, a system, and a vehicle/robot.

The vehicle/robot localization technology has been researched for many years, and many of the proposed benefits have been demonstrated in varied applications. In this technology, it is important to segment points in a real-time point cloud acquired by a vehicle/robot or in a point cloud map into point clusters and model the point clusters to represent environmental elements in the physical world. For representing the environmental elements, a hierarchical model such as the hierarchical SGM (Signatured Gaussian Mixture Model) model may help to achieve progressive levels of details, and can improve the efficiency of the algorithms for matching and recognition. For the hierarchical SGM model as used here, the related prior works include:

Region Growing NDT[1]: the point cloud is segmented using the region growing algorithm in 3D space and each cluster of point cloud are modeled by the NDT (Normal Distribution Transform) model.

Mult-Layered NDT[2]: the point cloud is segmented using the Octree and within each cell the points are fitted using a NDT model.

REFERENCE

[1] Das, Arun, and Steven L. Waslander. "Scan registration using segmented region growing NDT." The International Journal of Robotics Research 33.13 (2014): 1645-1663.
[2] Ulaş, Cihan, and Hakan Temeltş. "3D multi-layered normal distribution transform for fast and long range scan matching." Journal of Intelligent & Robotic Systems 71.1 (2013): 85-108.

However, the prior works like the Region Growing NDT and the Mult-Layered NDT are normally segmented the point cloud by 3D grid cells which may cause discontinuities at borders of the cells. In addition, the grid cells divide the point cloud in an equal way, where two separate parts of the point cloud may accidentally fall into one cell and get wrongly modeled. So the resulted model may easily get inaccurate.

In view of the foregoing, there is a need to provide a method and an apparatus for representing environmental elements, a system, and a vehicle/robot that enables more accurate segmentation of point clusters from a point cloud, so that more accurate models can be established to represent environmental elements.

An aspect of the present invention is to provide a novel method and an apparatus for representing environmental elements.

Another aspect of the present invention is to provide a system.

Another aspect of the present invention is to provide a vehicle/robot.

In accordance with an exemplary embodiment of the present invention, there is provided a computer-implemented method for representing environmental elements, comprising: receiving (101) scan data comprising at least a point cloud representing at least an environmental element from a sensor; segmenting (102) the point cloud into point clusters; partitioning (103) the point clusters into hierarchical grids; establishing (104) a Gaussian distribution for points in each cell of each of the hierarchical grids; and constructing (105) a Gaussian Mixture Model based on the Gaussian distribution for representing the environmental element.

Above method for representing environmental elements of this disclosure enables more accurate segmentation of point clusters from a point cloud, so that more accurate models can be established to represent environmental elements.

In accordance with an exemplary embodiment of the present invention, according to above-said method, wherein segmenting (102) the point cloud into point clusters further comprising segmenting the point cloud into point clusters using the region growing algorithm with a predetermined criterion of smooth.

In accordance with an exemplary embodiment of the present invention, according to above-said method, wherein the predetermined criterion of smooth being derived with following steps: for each point of the point cloud, getting (201) its neighboring points; transforming (202) the neighboring points into a local operation plane; for each point of the point cloud, calculating (203) principal curvatures of the local surface; calculating (204) surface curvature at one point of the point cloud to the direction of another point of the point cloud, surface curvature at the another point to the direction of the one point, and torsion of surface from the one point to the direction of the another point; and establishing (205) the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold.

In this disclosure, by segmenting the point cloud into point clusters using above predetermined criterion of smooth, each of the resulted point cluster is a 2D manifold and can be projected onto a plain. Comparing to the resulted point cluster is usually a 3D manifold by dividing the point cloud by the 3D grid cell in the prior art, point clusters segmented by using the predetermined criterion of smooth in this disclosure will be more accurate, so that more accurate models can be established.

In accordance with an exemplary embodiment of the present invention, according to above-said method, wherein transforming (202) the neighboring points into a local operation plane further comprising: fitting a local operation plane at a point of the neighboring points by using the Eigenvalue Decomposition of a matrix, and transforming the neighboring points into the local operation plane.

In accordance with an exemplary embodiment of the present invention, according to above-said method, wherein for each point of the point cloud, calculating (203) principal curvatures of the local surface further comprising: for each point, calculating local quadratic surface parameters in the local operation plane, constructing a Hessian Matrix for local quadratic surface based on the local quadratic surface parameters, and calculating eigenvalues of the Hessian Matrix as the principal curvatures of the local surface.

In accordance with an exemplary embodiment of the present invention, according to above-said method, wherein the surface curvature $K_{ij}$ at the one point $_Gp_i$ to the direction of the another point $_Gp_j$ being denoted as $$K_{ij} = \frac{d_{ij}^T}{\|d_{ij}\|}(v_{i1}\ v_{i2})H_i(v_{i1}\ v_{i2})^T\frac{d_{ij}}{\|d_{ij}\|},$$

the surface curvature $K_{ji}$ at the another point $_Gp_j$ to the direction of the one point $_Gp_i$ being denoted as $$K_{ji} = \frac{d_{ij}^T}{\|d_{ij}\|}(v_{j1}\ v_{j2})H_j(v_{j1}\ v_{j2})^T\frac{d_{ij}}{\|d_{ij}\|}, \quad (22)$$

the torsion of surface $\tau_{ij}$ from the one point $_Gp_i$ to the direction of the another point $_Gp_j$ being denoted as $$\tau_{ij} = \frac{d_{ij}(d_{ij} \times v_{i3})}{\|d_{ij}\|\|d_{ij} \times v_{i3}\|},$$

wherein $d_{ij}$ represents the vector at the one point $_Gp_i$ to the another point $_Gp_j$, $v_{i1}$, $v_{i2}$, $v_{i3}$ are the column vectors of the rotation matrix from the original point cloud coordinate system to the local operation plane coordinate system related to the one point $_Gp_i$, $v_{j1}$, $v_{j2}$, $v_{j3}$ are the column vectors of the rotation matrix from the original point cloud coordinate system to the local operation plane coordinate system related to the another point $_Gp_j$, $H_i$ is the Hessian Matrix related to the one point $_Gp_i$, $H_j$ is the Hessian Matrix related to the another point $_Gp_j$.

In accordance with an exemplary embodiment of the present invention, according to above-said method, wherein partitioning (103) the point clusters into hierarchical grids further comprising partitioning the point clusters into hierarchical grids by using the Quadtree.

In accordance with an exemplary embodiment of the present invention, according to above-said method, wherein establishing (104) a Gaussian distribution for points in each cell of each of the hierarchical grids further comprising establishing the Gaussian distribution for points in a cell of a higher layer based on the Gaussian distribution for points in each child cell of the cell in a lower layer adjacent to the higher layer.

In accordance with an exemplary embodiment of the present invention, according to above-said method, wherein at the lowest layer of the hierarchical grids, for points in a cell of the lowest layer $\{p_1, p_2, \ldots, p_n\}$ with $p_i=(x_i, y_i, z_i)^T$, the mean $\mu$ and covariance $\Sigma$ of the Gaussian distribution are $$\mu = \frac{1}{n}(p_1 + p_2 + \ldots + p_n),$$

-continued $$\Sigma = \frac{1}{n-1}\sum_{i=1}^{n}(p_i - \mu)(p_i - \mu)^T,$$

for each higher layer of the hierarchical grids, calculate the Gaussian distribution for points in a cell of the higher layer by minimizing the sum of L2 distances between the Gaussian distribution for points in the cell of the higher layer with the Gaussian distribution for points in each child cell of the cell in the lower layer adjacent to the higher layer, where $$L2=N(0|\mu_F-\mu_{Ci},\Sigma_F+\Sigma_{Ci})$$

wherein $\mu_F$ and $\Sigma_F$ are the mean and the covariance of the Gaussian distribution for the cell of the higher layer, respectively, $\mu_{Ci}$ and $\Sigma_{Ci}$ are the mean and the covariance of the Gaussian distribution for the ith child cell of the cell.

In this disclosure, the Gaussian distribution of a father cell of a higher layer is obtained by optimizing the L2 distance, it is more efficient than directly calculating the Gaussian distribution using the method for determining the Gaussian distribution of a cell of the lowest layer, and it is possible to avoid calculating the distribution from a number of original points. Moreover, directly calculating the Gaussian distribution is not easy to directly remove noise points, and since the L2 distance method described above is based on the existing Gaussian model, it can more easily to tick out the data that does not meet the conditions (Gaussian distributions with low similarity to the target distribution).

In accordance with an exemplary embodiment of the present invention, there is provided an apparatus for representing environmental elements, comprising: scan data receive module (501) configured to receive scan data comprising at least a point cloud representing at least an environmental element from a sensor; point cloud segment module (502) configured to segment the point cloud into point clusters; hierarchical grids partition module (503) configured to partition the point clusters into hierarchical grids; Gaussian distribution establish module (504) configured to establish a Gaussian distribution for points in each cell of each of the hierarchical grids; and Gaussian Mixture Model construct module (505) configured to construct a Gaussian Mixture Model based on the Gaussian distribution for representing the environmental element.

In accordance with an exemplary embodiment of the present invention, according above-said apparatus, wherein the point cloud segment module (502) further configured to: segment the point cloud into point clusters using the region growing algorithm with a predetermined criterion of smooth.

In accordance with an exemplary embodiment of the present invention, according above-said apparatus, wherein the predetermined criterion of smooth being derived with following steps: for each point of the point cloud, getting (201) its neighboring points; transforming (202) the neighboring points into a local operation plane; for each point of the point cloud, calculating (203) principal curvatures of the local surface; calculating (204) surface curvature at one point of the point cloud to the direction of another point of the point cloud, surface curvature at the another point to the direction of the one point, and torsion of surface from the one point to the direction of the another point; and establishing (205) the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold.

In accordance with an exemplary embodiment of the present invention, according above-said apparatus, wherein transforming (202) the neighboring points into a local operation plane further comprising: fitting a local operation plane at a point of the neighboring points by using the Eigenvalue Decomposition of a matrix, and transforming the neighboring points into the local operation plane.

In accordance with an exemplary embodiment of the present invention, according above-said apparatus, wherein for each point of the point cloud, calculating (203) principal curvatures of the local surface further comprising: for each point, calculating local quadratic surface parameters in the local operation plane, constructing a Hessian Matrix for local quadratic surface based on the local quadratic surface parameters, and calculating eigenvalues of the Hessian Matrix as the principal curvatures of the local surface.

In accordance with an exemplary embodiment of the present invention, according above-said apparatus, wherein the surface curvature $K_{ij}$ at the one point $_Gp_i$ to the direction of the another point $_Gp_j$ being denoted as $$K_{ij} = \frac{d_{ij}^T}{\|d_{ij}\|}(v_{i1}\ v_{i2})H_i(v_{i1}\ v_{i2})^T\frac{d_{ij}}{\|d_{ij}\|},$$

the surface curvature $K_{ji}$ at the another point $_Gp_j$ to the direction of the one point $_Gp_i$ being denoted as $$K_{ji} = \frac{d_{ij}^T}{\|d_{ij}\|}(v_{j1}\ v_{j2})H_j(v_{j1}\ v_{j2})^T\frac{d_{ij}}{\|d_{ij}\|},$$

the torsion of surface $\tau_{ij}$ from the one point $_Gp_i$ to the direction of the another point $_Gp_j$ being denoted as $$\tau_{ij} = \frac{d_{ij}(d_{ij} \times v_{i3})}{\|d_{ij}\|\|d_{ij} \times v_{i3}\|},$$

wherein $d_{ij}$ represents the vector at the one point $_Gp_i$ to the another point $_Gp_j$, $v_{i1}$, $v_{i2}$, $v_{i3}$ are the column vectors of the rotation matrix from the original point cloud coordinate system to the local operation plane coordinate system related to the one point $_Gp_i$, $v_{j1}$, $v_{j2}$, $v_{j3}$ are the column vectors of the rotation matrix from the original point cloud coordinate system to the local operation plane coordinate system related to the another point $_Gp_j$, $H_i$ is the Hessian Matrix related to the one point $_Gp_i$, $H_j$ is the Hessian Matrix related to the another point $_Gp_j$.

In accordance with an exemplary embodiment of the present invention, according above-said apparatus, wherein the hierarchical grids partition module (503) further configured to: partition the point clusters into hierarchical grids by using the Quadtree.

In accordance with an exemplary embodiment of the present invention, according above-said apparatus, wherein the Gaussian distribution establish module (504) further configured to establish the Gaussian distribution for points in a cell of a higher layer based on the Gaussian distribution for points in each child cell of the cell in a lower layer adjacent to the higher layer.

In accordance with an exemplary embodiment of the present invention, according above-said apparatus, wherein at the lowest layer of the hierarchical grids, for points in a cell $\{p_1, p_2, \ldots, p_n\}$ with $p_i=(x_i, y_i, z_i)^T$, calculate the mean $\mu$ and covariance $\Sigma$ of the Gaussian distribution by $$\mu = \frac{1}{n}(p_1 + p_2 + \ldots + p_n),$$

$$\sum = \frac{1}{n-1}\sum_{i=1}^{n}(p_i - \mu)(p_i - \mu)^T,$$

for each higher layer of the hierarchical grids, calculate the Gaussian distribution for points in a cell of the higher layer by minimizing the sum of L2 distances between the Gaussian distribution for points in the cell of the higher layer with the Gaussian distribution for points in each child cell of the cell in the lower layer adjacent to the higher layer, where $$L2=N(0|\mu_F-\mu_{Ci},\Sigma_F+\Sigma_{Ci})$$

wherein $\mu_F$ and $\Sigma_F$ are the mean and the covariance of the Gaussian distribution for the cell of the higher layer, respectively, $\mu_{Ci}$ and $\Sigma_{Ci}$ are the mean and the covariance of the Gaussian distribution for the ith child cell of the cell.

In accordance with an exemplary embodiment of the present invention, there is provided a system for representing environmental elements comprising a sensor (601) which detects at least an environmental element and outputs scan data comprising at least a point cloud, and an apparatus for representing environmental elements described above.

In accordance with an exemplary embodiment of the present invention, there is provided a vehicle/robot comprising a system for representing environmental elements described above.

This disclosure provides an effect that more accurate segmentation of point clusters from a point cloud is enabled, so that more accurate models can be established to represent environmental elements.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the disclosure.

FIG. 3 (b) shows a schematic diagram of the lower layer (second layer) adjacent to the highest layer of the hierarchical grids when segmenting a point cluster into three layers of hierarchical grids using the Quadtree.

FIG. 3 (c) shows a schematic diagram of the lower layer (third layer, lowest layer) adjacent to the second layer of the hierarchical grids when segmenting a point cluster into three layers of hierarchical grids using the Quadtree.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

A general idea of the present disclosure is to provide a novel method and an apparatus for representing environmental elements, a system, and a vehicle/robot.

Figure 1:
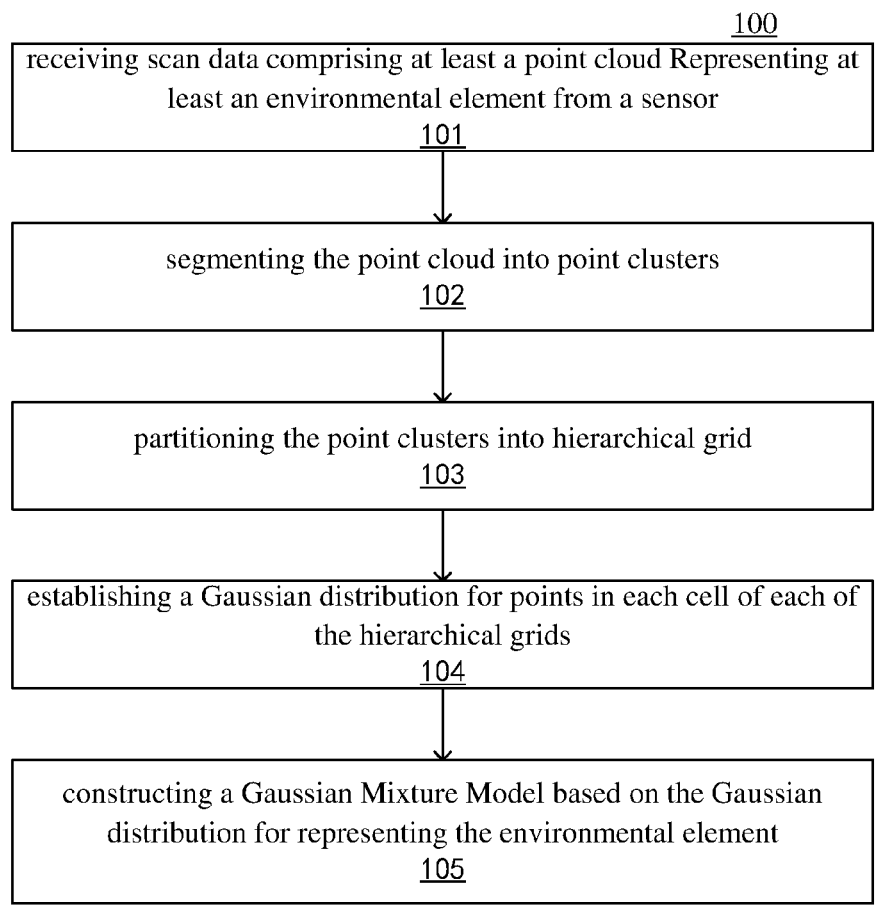
FIG. 1 shows a high level flow chart of a computer-implemented method 100 for representing environmental elements in accordance with an exemplary embodiment of the present disclosure.

Referring first to FIG. 1, there is shown a high level flow chart of a computer-implemented method 100 for representing environmental elements in accordance with an exemplary embodiment of the present disclosure. As shown in FIG. 1, a computer-implemented method 100 for representing environmental elements in accordance with an exemplary embodiment of the present disclosure comprises: receiving 101 scan data comprising at least a point cloud representing at least an environmental element from a sensor; segmenting 102 the point cloud into point clusters; partitioning 103 the point clusters into hierarchical grids; establishing 104 a Gaussian distribution for points in each cell of each of the hierarchical grids; and constructing 105 a Gaussian Mixture Model based on the Gaussian distribution for representing the environmental element.

Hereinafter, a computer-implemented method 100 for representing environmental elements in accordance with an exemplary embodiment of the present disclosure will be described in detail.

The method 100 starts with receiving 101 scan data comprising at least a point cloud representing at least an environmental element from a sensor.

As used herein, a sensor is a unit that can obtain environmental information in the physical world. A sensor detects at least an environment element and outputs scan data comprising at least a point cloud, the at least a point cloud representing the at least an environment element.

Usually, a sensor includes LiDAR (Light Imaging, Detection, And Ranging), camera, radar, and ultrasonic sensor.

LiDAR is an optical remote sensing technique that can measure a distance to a target or other properties of the target by using light, such as laser light. LiDAR can create a point cloud by measuring a large number of points on surface of object and output the point cloud as data. The laser data points in the point cloud can indicate position information of object in the environment with respect to the sensor and/or other information about the environment of the sensor.

Camera, such as a still camera, a video camera, etc., is configured to capture a plurality of images of the environment in which a vehicle is located. The camera may be capable of recording images in the infrared, visible, and/or ultraviolet frequency ranges. The camera may be configured to generate a two-dimensional image indicating a distance and/or heading of object in the environment.

Radar may represent an object detection system that utilizes radio signals to sense objects. In addition to sensing objects, radar may additionally be configured to perform digital signal processing and may be configured to sense the range, altitude, speed and/or heading of objects.

Ultrasonic sensor is a sensor developed from the use of ultrasonic characteristics, which mainly using a detection mode of direct reflection. The object to be detected that is located in front of the sensor causes the object to be detected by partially transmitting the emitted sound wave back to the receiver of the sensor. Usually, an ultrasonic sensor is configured to detect the distance and/or orientation of an object.

Then the method 100 goes to segmenting 102 the point cloud into point clusters. Here, point clusters in the point cloud can be generated by using the region growing algorithm with a predetermined criterion of smooth as will be described below. That is, the point cloud is segmented into point clusters using the region growing algorithm with a predetermined criterion of smooth.

Figure 2:
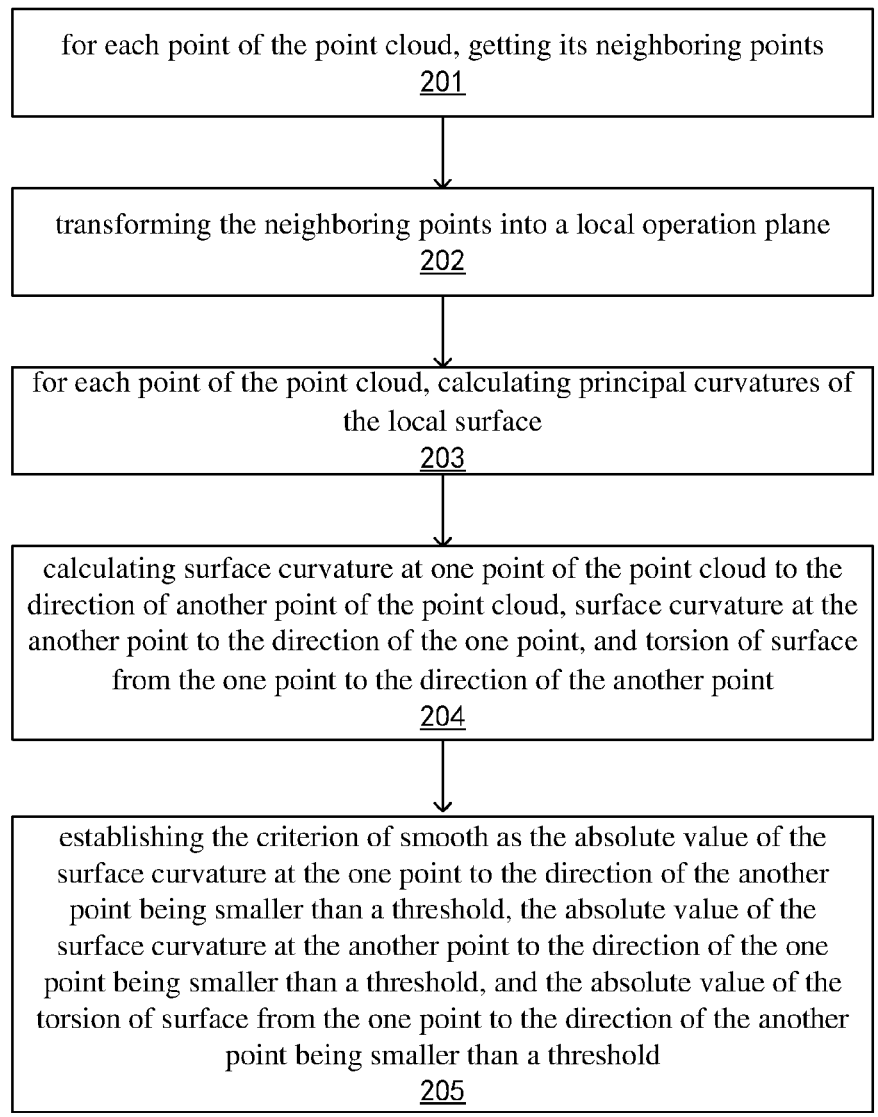
FIG. 2 shows a high level flow chart of a computer-implemented method 200 for deriving the predetermined criterion of smooth in accordance with an exemplary embodiment of the present disclosure.

Referring to FIG. 2, there is shown a high level flow chart of a computer-implemented method 200 for deriving above-said predetermined criterion of smooth in accordance with an exemplary embodiment of the present disclosure. As shown in FIG. 2, a computer-implemented method 200 for deriving above-said predetermined criterion of smooth in accordance with an exemplary embodiment of the present disclosure comprising: for each point of the point cloud, getting 201 its neighboring points; transforming 202 the neighboring points into a local operation plane; for each point of the point cloud, calculating 203 principal curvatures of the local surface; calculating 204 surface curvature at one point of the point cloud to the direction of another point of the point cloud, surface curvature at the another point to the direction of the one point, and torsion of surface from the one point to the direction of the another point; and establishing 205 the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold.

Alternatively, as can be understood, the predetermined criterion of smooth can be derived with but not limited to the steps as shown in FIG. 2.

Hereinafter, a computer-implemented method 200 for deriving above-said predetermined criterion of smooth in accordance with an exemplary embodiment of the present disclosure will be described in detail.

The method 200 starts with for each point of the point cloud, getting 201 its neighboring points. Here, For each point $_Gp$ of the point cloud, its neighboring points acquired can be denoted as $$P=\{_G^{ne}p_1, _G^{ne}p_2, \ldots, _G^{ne}p_n\},$$

wherein $$_Gp=(x,y,z)^T, \quad (1)$$

$$_G^{ne}p_i=(x_i,y_i,z_i)^T. \quad (2)$$

Above formulas (1) and (2) show the coordinates of the point $_Gp$ and the neighboring points $_G^{ne}p_i$ in the original point cloud coordinates system.

As used herein, the neighboring points for each point can be found by direct indexing if the point cloud is organized or by using the kd-tree if the point cloud is un-organized. Here, "organized" means points of the point cloud are ordered to be stored, for example, relative to the laser scanning sequence of the sensor, in other words, the relative positional relationship among points of the point cloud is known. On the contrary, "un-organized" means points of the point cloud are disordered to be stored, in other words, the relative positional relationship among points of the point cloud is unknown.

Then the method 200 goes to transforming 202 the neighboring points into a local operation plane. Here, a local operation plane at a point p of the neighboring points can be fitted by using the Eigenvalue Decomposition of the matrix C, wherein $$C = \frac{1}{n}\sum_{p\in P}(p-\mu_p)(p-\mu_p)^T = R^T \sum R. \quad (3)$$

In above formulas (3), $$\mu_p = \frac{1}{n+1}(_Gp + _G^{ne}p_1 + _G^{ne}p_2 + \ldots + _G^{ne}p_n), \quad (4)$$

and R is the rotation matrix from the original point cloud coordinate system to the local operation plane coordinates system, where $$R=(v_1 v_2 v_3). \quad (5)$$

Here, $v_1$, $v_2$ and $v_3$ are the column vectors.

Then, the neighboring points $_G^{ne}p_1, _G^{ne}p_2, \ldots, _G^{ne}p_n$ can be transformed into the local operation plane coordinate system by following formulas (6)

$$_L^{ne}p_i=R(_G^{ne}p_i-_Gp), i=1,2,\ldots,n. \quad (6)$$

Then the method 200 goes to for each point of the point cloud, calculating 203 principal curvatures of the local surface.

Specifically, for the point $_Gp$, denote $$_L^{ne}p_i = (_Lx_i, _Ly_i, _Lz_i)^T, \quad (7)$$

$$A = \begin{bmatrix} _Lx_1^2 & _Lx_1{_Ly_1} & _Ly_1^2 \\ \vdots & \vdots & \vdots \\ _Lx_n^2 & _Lx_n{_Ly_n} & _Ly_n^2 \end{bmatrix}, \quad (8)$$

$$b = \begin{bmatrix} _Lz_1 \\ \vdots \\ _Lz_n \end{bmatrix}, \quad (9)$$

wherein, above formula (7) shows the coordinates of the point $_Gp$ in the local operation plane coordinates system.

Then, by executing following formula (10), calculating local quadratic surface parameters $\{a_{xx}, a_{xy}, a_{yy}\}$ in the local operation plane, $$(a_{xx},a_{xy},a_{yy})^T=(A^TA)^{-1}A^Tb. \quad (10)$$

Next, based on above local quadratic surface parameters, constructing the Hessian Matrix H for the local quadratic surface as shown in following formula (11), $$H = \begin{bmatrix} a_{xx} & a_{xy} \\ a_{xy} & a_{yy} \end{bmatrix}. \quad (11)$$

Then, by following formula (12), executing the Eigenvalue Decomposition for H, $$H = U\begin{bmatrix} K_1 & 0 \\ 0 & K_2 \end{bmatrix}U^T. \quad (12)$$

The $K_1$ and $K_2$ calculated by above formula (12) are the eigenvalues of H and at the same time the principal curvatures of the local surface at point $_Gp$.

Next, the method 200 goes to calculating 204 surface curvature at one point of the point cloud to the direction of another point of the point cloud, surface curvature at the another point to the direction of the one point, and torsion of surface from the one point to the direction of the another point.

Specifically, denote the principal curvatures of $_Gp_i$ as $K_{i1}$, $K_{i2}$ and those of $_Gp_j$ as $K_{j1}$, $K_{j2}$, and denote the column vectors of the matrix R in above formula (5) for $_Gp_i$ as $v_{i1}$, $v_{i2}$, $v_{i3}$ and those for $_Gp_j$ as $v_{j1}$, $v_{j2}$, $v_{j3}$, and denote the Matrix H in above formula (11) as $H_i$ for $_Gp_i$ and that for $_Gp_j$ as $H_j$.

Denote $$K_{ij} = \frac{d_{ij}^T}{\|d_{ij}\|}(v_{i1}\ v_{i2})H_i(v_{i1}\ v_{i2})^T\frac{d_{ij}}{\|d_{ij}\|}, \quad (13)$$

wherein, $K_{ij}$ represents the surface curvature at $_Gp_i$ to the direction of $_Gp_j$, $d_{ij}$ represents the vector at $_Gp_i$ to $_Gp_j$, $$K_{ji} = \frac{d_{ij}^T}{\|d_{ij}\|}(v_{j1}\ v_{j2})H_j(v_{j1}\ v_{j2})^T\frac{d_{ij}}{\|d_{ij}\|}, \quad (14)$$

wherein, $K_{ji}$ represents the surface curvature at $_Gp_j$ to the direction of $_Gp_i$, $$\tau_{ij} = \tau_{ji} = \frac{d_{ij}(d_{ij} \times v_{i3})}{\|d_{ij}\|\|d_{ij} \times v_{i3}\|}, \quad (15)$$

wherein, $\tau_{ij}$ represents torsion of the surface from $_Gp_i$ to the direction of $_Gp_j$, $\tau_{ji}$ represents torsion of the surface from $_Gp_j$ to the direction of $_Gp_i$.

The method 200 ends with establishing 205 the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold. Specifically, for example, for $_Gp_i$ and $_Gp_j$, the predetermined criterion of smooth established is shown as following formula (16):

$$\begin{cases} |K_{ij}| < K_{th} \\ |K_{ji}| < K_{th} \\ |\tau_{ij}| < \tau_{th} \end{cases} \quad (16)$$

with $K_{th}$ and $\tau_{th}$ being the thresholds.

As used herein, in this disclosure, by segmenting the point cloud into point clusters using above predetermined criterion of smooth, each of the resulted point clusters is a 2D manifold and can be projected onto a plain. Comparing to each of the resulted point clusters is usually a 3D manifold by dividing the point cloud by 3D grid cells in the prior art, point clusters segmented by using the predetermined criterion of smooth in this disclosure will be more accurate, so that more accurate models can be established.

Returning back to FIG. 1, then, the method 100 goes to partitioning 103 the point clusters into hierarchical grids. Here, partitioning the point clusters into hierarchical grids by using the Quadtree. More specifically, for each point cluster, partitioning the point cluster into hierarchical grids by using the Quadtree. As said above, since the point cloud is segmented using the predetermined criterion of smooth, each of the resulted point clusters is a 2D manifold and can be projected onto a plain, the Quadtree partition can be executed on the projection plane. But in the following calculations as will be described, still use the original positions in 3D for the points.

Figure 3:
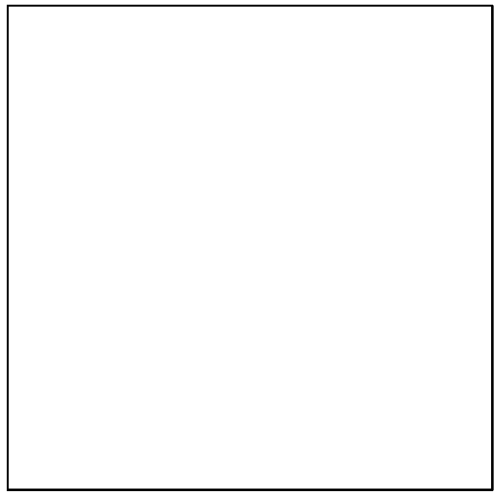
FIG. 3 (a) shows a schematic diagram of the highest layer (first layer) of the hierarchical grids when segmenting a point cluster into three layers of hierarchical grids using the Quadtree.
Figure 3:
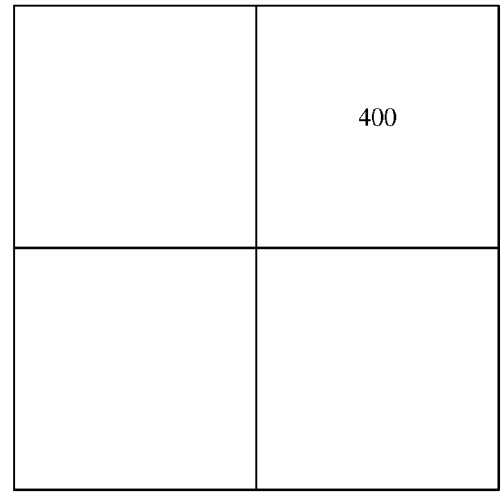
Figure 3:
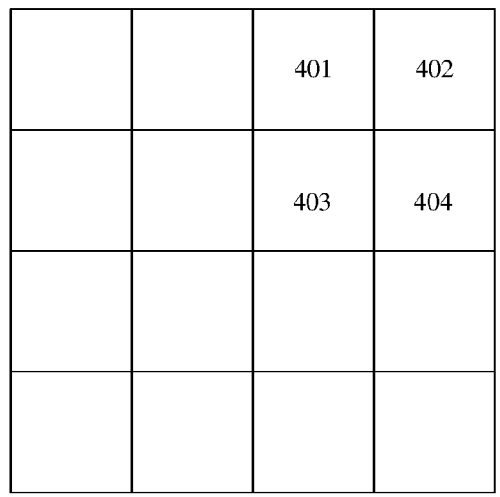

Usually, for hierarchical grids by segmenting a point cluster by using the Quadtree, the highest layer of the hierarchical grids has one cell, and the cells of the next each layer of the hierarchical grids can be obtained by segmenting each cell of its adjacent higher layer of the hierarchical grids into four cells, that is, one cell (father cell of the higher layer of the hierarchical grids in the adjacent layers of the hierarchical grids corresponds to four cells (child cells) of the lower layer of the hierarchical grids. For example, when a point cluster is partitioned into for layers of the hierarchical grids, the highest layer of the hierarchical grids has one cell (father cell), and the following lower layers of the hierarchical grids will correspondingly have 4 cells, 16 cells, 64 cells, respectively. For example, FIG. 3 (a) shows a schematic diagram of the highest layer (first layer) of the hierarchical grids when segmenting a point cluster into three layers of hierarchical grids using the Quadtree; FIG. 3 (b) shows a schematic diagram of the lower layer (second layer) adjacent to the highest layer of the hierarchical grids when segmenting a point cluster into three layers of hierarchical grids using the Quadtree; FIG. 3 (c) shows a schematic diagram of the lower layer (third layer, lowest layer) adjacent to the second layer of the hierarchical grids when segmenting a point cluster into three layers of hierarchical grids using the Quadtree. As an example, as shown in FIG. 3 (b) and FIG. 3 (c), a cell 400 (father cell) in the hierarchical grid in FIG. 3 (b) corresponds to four cells 401, 402, 403, 404 (child cells) in the hierarchical grid in FIG. 3 (c). In addition, it is understood that by the step 103, some cells in the hierarchical grids may have no points belonging therein.

Then, the method 100 goes to establishing 104 a Gaussian distribution for points in each cell of each of the hierarchical grids According to the definition of Gaussian distributions, it is known that the geometric shape of a Gaussian distribution in a two dimensional space resembles that of an ellipse, and that the geometric shape of a Gaussian distribution in a three dimensional space resembles that of an ellipsoid.

In this disclosure, establishing 104 a Gaussian distribution for points in each cell of each of the hierarchical grids further comprising establishing the Gaussian distribution for points in a cell of a higher layer based on the Gaussian distribution for points in each child cell of the cell in a lower layer adjacent to the higher layer.

Specifically, at the lowest layer of the hierarchical grids, for points belonging to a cell $\{p_1, p_2, \ldots, p_n\}$ with $p_i = (x_i, y_i, z_i)^T$, the mean $\mu$ and covariance $\Sigma$ of the Gaussian distribution $N(\mu, \Sigma)$ corresponding to the cell are obtained by following formulas (17) and (18), $$\mu = \frac{1}{n}(p_1 + p_2 + \ldots + p_n), \quad (17)$$

$$\Sigma = \frac{1}{n-1}\sum_{i=1}^{n}(p_i - \mu)(p_i - \mu)^T. \quad (18)$$

Further, for each higher layer of the hierarchical grids, denote the Gaussian distribution corresponding to a cell of a higher layer of the hierarchical grids having points belonging therein as $N(\mu_F, \Sigma_F)$, and denote the Gaussian distributions corresponding to the child cells of above cell (father cell) in the lower layer adjacent to the higher layer having points belonging therein as $N(\mu_{C1}, \Sigma_{C1})$, $N(\mu_{C2}, \Sigma_{C2})$, ..., $N(\mu_{Cm}, \Sigma_{Cm})$, $m \leq 4$.

Denote a L2 distance between two Gaussian distributions $N(\mu_F, \Sigma_F)$ and $N(\mu_{Ci}, \Sigma_{Ci})$ as $$L2 = N(0|\mu_F - \mu_{Ci}, \Sigma_F + \Sigma_{Ci}), \quad (19)$$

by adjusting the mean $\mu_F$ and covariance $\Sigma_F$ of the Gaussian distribution $N(\mu_F, \Sigma_F)$ corresponding to the father cell to minimize the sum of the L2 distances between the Gaussian distribution $N(\mu_F, \Sigma_F)$ with the Gaussian distributions $N(\mu_{C1}, \Sigma_{C1})$, $N(\mu_{C2}, \Sigma_{C2})$, ..., $N(\mu_{Cm}, \Sigma_{Cm})$, $m \leq 4$ of the child cells of the father cell to obtain the mean $\mu_F$ and covariance $\Sigma_F$ of the Gaussian distribution $N(\mu_F, \Sigma_F)$.

Figure 4:
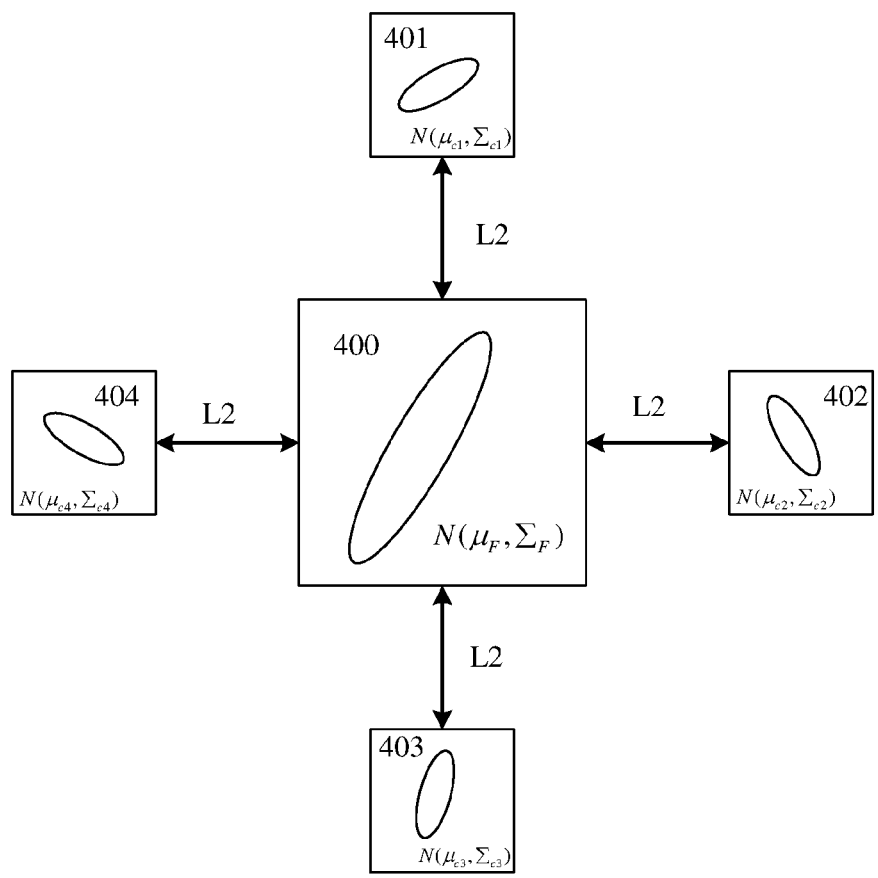
FIG. 4 shows a schematic diagram for establishing a Gaussian distribution for points in the grid 400 shown in FIG. 3.

FIG. 4 shows a schematic diagram for establishing a Gaussian distribution for points belonging to the cell 400 shown in FIG. 3. For example, as shown in FIG. 4, the Gaussian distribution corresponding to the cell 400 is $N(\mu_F, \Sigma_F)$, and the Gaussian distributions corresponding to the child cells 401, 402, 403, 404 of the father cell 400 are $N(\mu_{C1}, \Sigma_{C1})$, $N(\mu_{C2}, \Sigma_{C2})$, $N(\mu_{C3}, \Sigma_{C3})$, $N(\mu_{C4}, \Sigma_{C4})$, respectively. Using above formula (19) to calculate the L2 distances between the Gaussian distribution N ($\mu_F$, $\Sigma_F$) and the Gaussian distributions N ($\mu_{C1}$, $\Sigma_{C1}$), N ($\mu_{C2}$, $\Sigma_{C2}$), N ($\mu_{C3}$, $\Sigma_{C3}$), N ($\mu_{C4}$, $\Sigma_{C4}$), and determine the Gaussian distribution N ($\mu_F$, $\Sigma_F$) by adjusting the mean $\mu_F$ and covariance $\Sigma_F$ to minimize the sum of above L2 distance.

As used herein, the L2 distance expression shown by the above formula (19) represents the probability density value when the independent variable of the Gaussian distribution is zero. This L2 distance measures the degree of dissimilarity of the two Gaussian distributions with a range of values 0-1. When the value is 0, the two Gaussian distributions are completely the same, and when the value is 1, the two Gaussian distributions are very dissimilar.

As an alternative, the Gaussian distribution of a father cell of a higher layer can also be calculated directly using the method for determining the Gaussian distribution of a cell of the lowest layer. However, by optimizing the L2 distance as described above to obtain the Gaussian distribution of a father cell of a higher layer, it is more efficient than directly calculating the Gaussian distribution using the method for determining the Gaussian distribution of a cell of the lowest layer, and it is possible to avoid calculating the distribution from a number of original points. Moreover, directly calculating the Gaussian distribution is not easy to directly remove noise points, and since the L2 distance method described above is based on the existing Gaussian model, it can more easily to tick out the data that does not meet the conditions (Gaussian distributions with low similarity to the target distribution).

Next, the method 100 ends with constructing 105 a Gaussian Mixture Model based on the Gaussian distribution for representing the environmental element.

Specifically, for each layer of the hierarchical grids, constructing a Gaussian Mixture Model based on the established one or more Gaussian distributions corresponding to the one or more cells of this layer of the hierarchical grids. Thus, for a number of layers of the hierarchical grids partitioned for each point cluster, a number of Gaussian Mixture Models with one Gaussian Mixture Model corresponding to one layer of the hierarchical grids will be constructed. Here, for a point cluster, one Gaussian Mixture Model corresponding to one layer of the hierarchical grids represents one level of precision, and one can choose a Gaussian Mixture Model with required level of precision from all the Gaussian Mixture Models for a point cluster.

As used herein, the constructed Gaussian Mixture Model is used for representing the environmental element. Specifically, a signature for identifying the environmental element will be generated, and a Signatured Gaussian Mixture Model comprising the Gaussian Mixture Model and the signature will be constructed.

Figure 5:
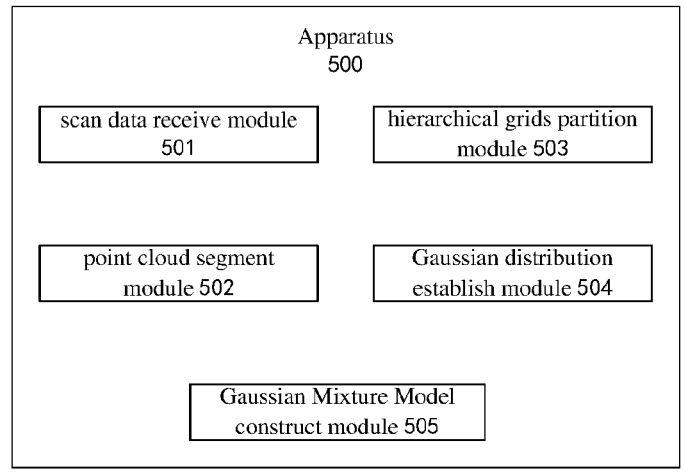
FIG. 5 illustrates a structural diagram of an apparatus 500 for representing environmental elements in accordance with an exemplary embodiment of the present disclosure.

FIG. 5 illustrates a structural diagram of an apparatus 500 for representing environmental elements in accordance with an exemplary embodiment of the present disclosure.

As shown in FIG. 5, the apparatus 500 may comprise a scan data receive module 501 configured to receive scan data comprising at least a point cloud representing at least an environmental element from a sensor; a point cloud segment module 502 configured to segment the point cloud into point clusters; a hierarchical grids partition module 503 configured to partition the point clusters into hierarchical grids; a Gaussian distribution establish module 504 configured to establish a Gaussian distribution for points in each cell of each of the hierarchical grids; and a Gaussian Mixture Model construct module 505 configured to construct a Gaussian Mixture Model based on the Gaussian distribution for representing the environmental element.

It is noted that the scan data receive module 501, the point cloud segment module 502, the hierarchical grids partition module 503, the Gaussian distribution establish module 504 and the Gaussian Mixture Model construct module 505 of the apparatus 500 can be configured to perform corresponding operations in method 100, and the descriptions directed to method 100 are equally applicable to the apparatus 500.

In accordance with an exemplary embodiment of the present invention, wherein the point cloud segment module 502 further configured to segment the point cloud into point clusters using the region growing algorithm with the predetermined criterion of smooth.

In accordance with an exemplary embodiment of the present invention, wherein the predetermined criterion of smooth being derived with the steps shown in FIG. 2: for each point of the point cloud, getting 201 its neighboring points; transforming 202 the neighboring points into a local operation plane; for each point of the point cloud, calculating 203 principal curvatures of the local surface; calculating 204 surface curvature at one point of the point cloud to the direction of another point of the point cloud, surface curvature at the another point to the direction of the one point, and torsion of surface from the one point to the direction of the another point; and establishing 205 the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold.

In accordance with an exemplary embodiment of the present invention, wherein transforming 202 the neighboring points into a local operation plane further comprising: fitting a local operation plane at a point of the neighboring points by using the Eigenvalue Decomposition of a matrix, and transforming the neighboring points into the local operation plane.

In accordance with an exemplary embodiment of the present invention, according above-said apparatus, wherein for each point of the point cloud, calculating 203 principal curvatures of the local surface further comprising: for each point, calculating local quadratic surface parameters in the local operation plane, constructing a Hessian Matrix for local quadratic surface based on the local quadratic surface parameters, and calculating eigenvalues of the Hessian Matrix as the principal curvatures of the local surface.

In accordance with an exemplary embodiment of the present invention, according above-said apparatus, wherein the surface curvature $K_{ij}$ at the one point $_G p_i$ to the direction of the another point $_G p_j$ being denoted as $$K_{ij} = \frac{d_{ij}^T}{\|d_{ij}\|}(v_{i1} \quad v_{i2})H_i(v_{i1} \quad v_{i2})^T \frac{d_{ij}}{\|d_{ij}\|},$$

the surface curvature $K_{ji}$ at the another point $_G p_j$ to the direction of the one point $_G p_i$ being denoted as $$K_{ji} = \frac{d_{ij}^T}{\|d_{ij}\|}(v_{j1} \quad v_{j2})H_j(v_{j1} \quad v_{j2})^T \frac{d_{ij}}{\|d_{ij}\|},$$

the torsion of surface $\tau_{ij}$ from the one point $_G p_i$ to the direction of the another point $_G p_j$ being denoted as $$\tau_{ij} = \frac{d_{ij}(d_{ij} \times v_{i3})}{\|d_{ij}\|\|d_{ij} \times v_{i3}\|},$$

wherein $d_{ij}$ represents the vector at the one point $_G p_i$ to the another point $_G p_j$, $v_{i1}$, $v_{i2}$, $v_{i3}$ are the column vectors of the rotation matrix from the original point cloud coordinate system to the local operation plane coordinate system related to the one point $_G p_i$, $v_{j1}$, $v_{j2}$, $v_{j3}$ are the column vectors of the rotation matrix from the original point cloud coordinate system to the local operation plane coordinate system related to the another point $_G p_j$, $H_i$ is the Hessian Matrix related to the one point $_G p_i$, $H_j$ is the Hessian Matrix related to the another point $_G p_j$.

In accordance with an exemplary embodiment of the present invention, according above-said apparatus, wherein the hierarchical grids partition module (503) further configured to: partition the point clusters into hierarchical grids by using the Quadtree.

In accordance with an exemplary embodiment of the present invention, according above-said apparatus, wherein the Gaussian distribution establish module (504) further configured to establish the Gaussian distribution for points in a cell of a higher layer based on the Gaussian distribution for points in each child cell of the cell in a lower layer adjacent to the higher layer.

In accordance with an exemplary embodiment of the present invention, according above-said apparatus, wherein at the lowest layer of the hierarchical grids, for points in a cell $\{p_1, p_2, \ldots, p_n\}$ with $p_i=(x_i, y_i, z_i)^T$, calculate the mean $\mu$ and covariance $\Sigma$ of the Gaussian distribution by $$\mu = \frac{1}{n}(p_1 + p_2 + \ldots + p_n),$$
$$\Sigma = \frac{1}{n-1}\sum_{i=1}^{n}(p_i - \mu)(p_i - \mu)^T,$$

for each higher layer of the hierarchical grids, calculate the Gaussian distribution for points in a cell of the higher layer by minimizing the sum of L2 distances between the Gaussian distribution for points in the cell of the higher layer with the Gaussian distribution for points in each child cell of the cell in the lower layer adjacent to the higher layer, where $$L2=N(0|\mu_F-\mu_{Ci},\Sigma_F+\Sigma_{Ci})$$

wherein $\mu_F$ and $\Sigma_F$ are the mean and the covariance of the Gaussian distribution for the cell of the higher layer, respectively, $\mu_{Ci}$ and $\Sigma_{Ci}$ are the mean and the covariance of the Gaussian distribution for the ith child cell of the cell.

Figure 6:
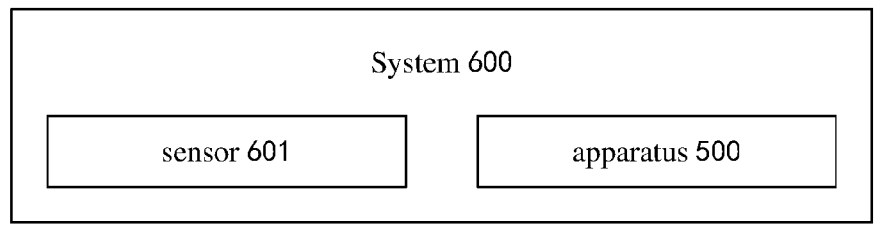
FIG. 6 illustrates a structural diagram of a system 600 for representing environmental elements in accordance with an exemplary embodiment of the present disclosure.

FIG. 6 illustrates a structural diagram of a system 600 for representing environmental elements in accordance with an exemplary embodiment of the present disclosure. The system 600 for representing environmental elements may comprise a sensor 601 which detects at least an environmental element and outputs scan data comprising at least a point cloud, and an apparatus 500 as shown in FIG. 5.

Figure 7:
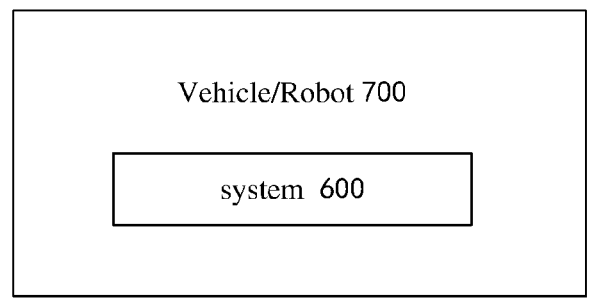
FIG. 7 illustrates a structural diagram of a vehicle/robot 700 in accordance with an exemplary embodiment of the present disclosure.

FIG. 7 illustrates a structural diagram of a vehicle/robot 700 in accordance with an exemplary embodiment of the present disclosure. The vehicle/robot 700 may comprise a system 600 for representing environmental elements as shown in FIG. 6.

According to an exemplary embodiment of the present disclosure, there is provided an apparatus for representing environmental elements in accordance with an exemplary embodiment of the present disclosure. The apparatus for representing environmental elements may comprises a memory, having computer executable instructions stored therein; and a processor, coupled to the memory and configured to: receiving scan data comprising at least a point cloud representing at least an environmental element from a sensor; segmenting the point cloud into point clusters; partitioning the point clusters into hierarchical grids; establishing a Gaussian distribution for points in each cell of each of the hierarchical grids; and constructing a Gaussian Mixture Model based on the Gaussian distribution for representing the environmental element.

According to an exemplary embodiment of the present disclosure, there is provided a non-transient storage medium having instructions stored thereon that when executed cause a processor to implement computer-implemented method for representing environmental elements in accordance with an exemplary embodiment of the present disclosure, comprising: instructions for receiving scan data comprising at least a point cloud representing at least an environmental element from a sensor; instructions for segmenting the point cloud into point clusters; instructions for partitioning the point clusters into hierarchical grids; instructions for establishing a Gaussian distribution for points in each cell of each of the hierarchical grids; and instructions for constructing a Gaussian Mixture Model based on the Gaussian distribution for representing the environmental element.

Figure 8:
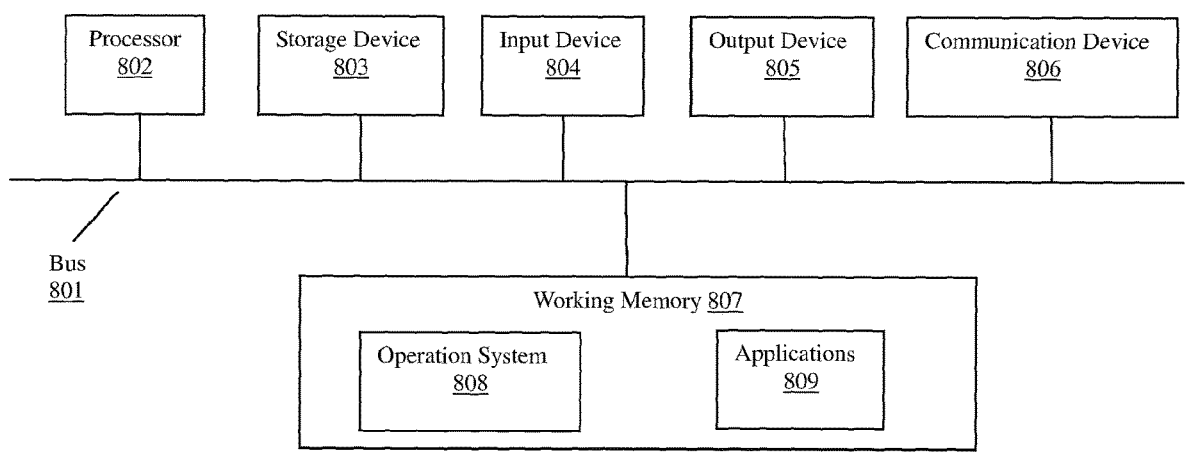
FIG. 8 illustrates a block diagram of computing device which is an example of the hardware device that may be applied to the aspects of the present disclosures in accordance with an exemplary embodiment of the present disclosure.

FIG. 8 illustrates a block diagram of computing device which is an example of the hardware device that may be applied to the aspects of the present disclosures in accordance with an exemplary embodiment of the present disclosure.

With reference to FIG. 8, a computing device 800, which is an example of the hardware device that may be applied to the aspects of the present disclosures, will now be described. The computing device 800 may be any machine configured to perform processing and/or calculations, may be but is not limited to a work station, a server, a desktop computer, a laptop computer, a tablet computer, a personal data assistant, a smart phone, an on-vehicle computer or any in combination. The aforementioned various apparatuses/server/client device may be wholly or at least partially implemented by the computing device 800 or a similar device or system.

The computing device 800 may comprise elements that are connected with or in communication with a bus 801, possibly via one or more interfaces. For example, the computing device 800 may comprise the bus 801, and one or more processors 802, one or more input devices 804 and one or more output devices 805. The one or more processors 802 may be any kinds of processors, and may comprise but are not limited to one or more general-purpose processors and/or one or more special-purpose processors (such as special processing chips). The input devices 804 may be any kinds of devices that can input information to the computing device, and may comprise but are not limited to a mouse, a keyboard, a touch screen, a microphone and/or a remote control. The output devices 805 may be any kinds of devices that can present information, and may comprise but are not limited to display, a speaker, a video/audio output terminal, a vibrator and/or a printer. The computing device 800 may also comprise or be connected with non-transitory storage devices 803 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 803 may be detachable from an interface. The non-transitory storage devices 803 may have data/instructions/code for implementing the methods and steps which are described above. The computing device 800 may also comprise a communication device 806. The communication device 806 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the computing device 800 is used as an on-vehicle device, it may also be connected to external device, for example, a GPS receiver, sensors for sensing different environmental data such as an acceleration sensor, a wheel speed sensor, a gyroscope and so on. In this way, the computing device 800 may, for example, receive location data and sensor data indicating the travelling situation of the vehicle. When the computing device 800 is used as an on-vehicle device, it may also be connected to other facilities (such as an engine system, a wiper, an anti-lock Braking System or the like) for controlling the traveling and operation of the vehicle.

In addition, the non-transitory storage devices 803 may have map information and software elements so that the processor 802 may perform route guidance processing. In addition, the output device 805 may comprise a display for displaying the map, the location mark of the vehicle and also images indicating the travelling situation of the vehicle. The output device 805 may also comprise a speaker or interface with an ear phone for audio guidance.

The bus 801 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 801 may also include a Controller Area Network (CAN) bus or other architectures designed for application on an automobile.

The computing device 800 may also comprise a working memory 807, which may be any kind of working memory that may store instructions and/or data useful for the working of the processor 802, and may comprise but is not limited to a random access memory and/or a read-only memory device.

Software elements may be located in the working memory 807, including but are not limited to an operating system 808, one or more application programs 809, drivers and/or other data and codes. Instructions for performing the methods and steps described in the above may be comprised in the one or more application programs 809, and the means/units/elements of the aforementioned various apparatuses/server/client device may be implemented by the processor 802 reading and executing the instructions of the one or more application programs 809.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

As described above, the method and the apparatus for representing environmental elements, the system, and the vehicle/robot of this disclosure enables more accurate segmentation of point clusters from a point cloud, so that more accurate models can be established to represent environmental elements.

Although aspects of the present disclosures have been described by far with reference to the drawings, the methods, systems, and devices described above are merely exemplary examples, and the scope of the present disclosure is not limited by these aspects, but is only defined by the appended claims and equivalents thereof. Various elements may be omitted or may be substituted by equivalent elements. In addition, the steps may be performed in an order different from what is described in the present disclosures. Furthermore, various elements may be combined in various manners. What is also important is that as the technology evolves, many of the elements described may be substituted by equivalent elements which emerge after the present disclosure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-implemented method for representing environmental elements, comprising:
    receiving scan data comprising at least a point cloud representing at least an environmental element from a sensor;
    segmenting the point cloud into point clusters using a region growing algorithm with a predetermined criterion of smooth;
    partitioning the point clusters into hierarchical grids;
    establishing a Gaussian distribution for points in each cell of each of the hierarchical grids; and
    constructing a Gaussian Mixture Model based on the Gaussian distribution for representing the environmental element,
    wherein the predetermined criterion of smooth is derived by:
        for each point of the point cloud, getting its neighboring points;
        transforming the neighboring points into a local operation plane;
        for each point of the point cloud, calculating principal curvatures of the local surface;
        calculating surface curvature at one point of the point cloud to the direction of another point of the point cloud, surface curvature at the another point to the direction of the one point, and torsion of surface from the one point to the direction of the another point; and establishing the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold, and wherein the surface curvature $K_{ij}$ at the one point to the direction of the another point $_Gp_j$ is denoted as:

$$K_{ij} = \frac{d_{ij}^T}{\|d_{ij}\|} (v_{i1} \quad v_{i2}) H_i (v_{i1} \quad v_{i2})^T \frac{d_{ij}}{\|d_{ij}\|},$$

the surface curvature $K_{ji}$ at the another point $_Gp_j$ to the direction of the one point $_Gp_i$ is denoted as $$K_{ji} = \frac{d_{ij}^T}{\|d_{ij}\|} (v_{j1} \quad v_{j2}) H_j (v_{j1} \quad v_{j2})^T \frac{d_{ij}}{\|d_{ij}\|},$$

and the torsion of surface $T_{ij}$ from the one point $_Gp_i$ to the direction of the another point $_Gp_j$ is denoted as $$T_{ij} = \frac{d_{ij}(d_{ij} \times v_{i3})}{\|d_{ij}\| \|d_{ij} \times v_{i3}\|},$$

where $d_{ij}$ represents the vector at the one point $_Gp_i$ to the another point $_Gp_j$, $v_{i1}$, $v_{i2}$, $v_{i3}$ are the column vectors of the rotation matrix from the original point cloud coordinate system to the local operation plane coordinate system related to the one point, $_Gp_i$, $v_{j1}$, $v_{j2}$, $v_{j3}$ are the column vectors of the rotation matrix from the original point cloud coordinate system to the local operation plane coordinate system related to the another point $_Gp_j$, $H_i$ is the Hessian Matrix related to the one point $_Gp_i$, and $H_j$ is the Hessian Matrix related to the another point $_Gp_j$.

2. The method according to claim 1, wherein transforming the neighboring points into a local operation plane further comprising fitting a local operation plane at a point of the neighboring points by using an Eigenvalue Decomposition of a matrix, and transforming the neighboring points into the local operation plane.

3. The method according to claim 1, wherein for each point of the point cloud, calculating principal curvatures of the local surface further comprising:
  for each point, calculating local quadratic surface parameters in the local operation plane;
  constructing a Hessian Matrix for local quadratic surface based on the local quadratic surface parameters; and
  calculating eigenvalues of the Hessian Matrix as the principal curvatures of the local surface.

4. The method according to claim 1, wherein said partitioning the point clusters into hierarchical grids further comprising partitioning the point clusters into hierarchical grids using a Quadtree.

5. The method according to claim 1, wherein establishing the Gaussian distribution for points in each cell of each of the hierarchical grids further comprising establishing the Gaussian distribution for points in a cell of a higher layer based on the Gaussian distribution for points in each child cell of the cell in a lower layer adjacent to the higher layer.

6. The method according to claim 5, wherein at the lowest layer of the hierarchical grids, for points in a cell of the lowest layer $\{p_1, p_2, \ldots, p_n\}$ with $p_i=(x_i, y_i, z_i)^T$, the mean $\mu$ and covariance $\Sigma$ of the Gaussian distribution are $$\mu = \frac{1}{n}(p_1 + p_2 + \ldots + p_n),$$

$$\Sigma = \frac{1}{n-1} \sum_{i=1}^{n} (p_i - \mu)(p_i - \mu)^T$$

for each higher layer of the hierarchical grids, calculate the Gaussian distribution for points in a cell of the higher layer by minimizing the sum of L2 distances between the Gaussian distribution for points in the cell of the higher layer with the Gaussian distribution for points in each child cell of the cell in the lower layer adjacent to the higher layer, where L2=$N(0|\mu_F-\mu_{ci}, \Sigma_F+\Sigma_{ci})$ wherein $\mu_F$ and $\Sigma_F$ are the mean and the covariance of the Gaussian distribution for the cell of the higher layer, respectively, $\mu_{ci}$ and $\Sigma_{ci}$ are the mean and the covariance of the Gaussian distribution for the ith child cell of the cell.

7. An apparatus for representing environmental elements, comprising:
  a scan data receive module configured to receive scan data comprising at least a point cloud representing at least an environmental element from a sensor;
  a point cloud segment module configured to segment the point cloud into point clusters using a region growing algorithm with a predetermined criterion of smooth;
  a hierarchical grids partition module configured to partition the point clusters into hierarchical grids;
  a Gaussian distribution establish module configured to establish a Gaussian distribution for points in each cell of each of the hierarchical grids; and
  a Gaussian Mixture Model construct module configured to construct a Gaussian Mixture Model based on the Gaussian distribution for representing the environmental element,
  wherein the predetermined criterion of smooth is derived by:
    for each point of the point cloud, getting its neighboring points;
    transforming the neighboring points into a local operation plane;
    for each point of the point cloud, calculating principal curvatures of the local surface;
    calculating surface curvature at one point of the point cloud to the direction of another point of the point cloud, surface curvature at the another point to the direction of the one point, and torsion of surface from the one point to the direction of the another point; and
    establishing the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold, and wherein the surface curvature $K_{ij}$ at the one point $_Gp_i$ to the direction of the another point $_Gp_j$ is denoted as:

$$K_{ij} = \frac{d_{ij}^T}{\|d_{ij}\|}(v_{i1} \ v_{i2})H_i(v_{i1} \ v_{i2})^T \frac{d_{ij}}{\|d_{ij}\|},$$

the surface curvature $K_{ji}$ at the another point to the direction of the one point $_Gp_i$ is denoted as $$K_{ji} = \frac{d_{ij}^T}{\|d_{ij}\|}(v_{j1} \ v_{j2})H_j(v_{j1} \ v_{j2})^T \frac{d_{ij}}{\|d_{ij}\|},$$

and
the torsion of surface $T_{ij}$ from the one point $_Gp_i$ to the direction of the another point $_Gp_j$ is denoted as $$T_{ij} = \frac{d_{ij}(d_{ij} \times v_{i3})}{\|d_{ij}\|\|d_{ij} \times v_{i3}\|},$$

where $d_{ij}$ represents the vector at the one point $_Gp_i$ to the another point $_Gp_j$, $v_{i1}$, $v_{i2}$, $v_{i3}$ are the column vectors of the rotation matrix from the original point cloud coordinate system to the local operation plane coordinate system related to the one point, $_Gp_i$, $v_{j1}$, $v_{j2}$, $v_{j3}$ are the column vectors of the rotation matrix from the original point cloud coordinate system to the local operation plane coordinate system related to the another point $_Gp_j$, $H_i$ is the Hessian Matrix related to the one point $_Gp_i$, and $H_j$ is the Hessian Matrix related to the another point $_Gp_j$.

8. The apparatus according to claim 7, wherein transforming the neighboring points into a local operation plane further comprising fitting a local operation plane at a point of the neighboring points by using an Eigenvalue Decomposition of a matrix, and transforming the neighboring points into the local operation plane.

9. The apparatus according to claim 7, wherein for each point of the point cloud, calculating principal curvatures of the local surface further comprising:
for each point, calculating local quadratic surface parameters in the local operation plane,
constructing a Hessian Matrix for local quadratic surface based on the local quadratic surface parameters, and
calculating eigenvalues of the Hessian Matrix as the principal curvatures of the local surface.

10. The apparatus according to claim 7, wherein the hierarchical grids partition module is further configured to partition the point clusters into hierarchical grids by using a Quadtree.

11. The apparatus according to claim 7, wherein the Gaussian distribution establish module is further configured to establish the Gaussian distribution for points in a cell of a higher layer based on the Gaussian distribution for points in each child cell of the cell in a lower layer adjacent to the higher layer.

12. The apparatus according to claim 11, wherein at the lowest layer of the hierarchical grids, for points in a cell $\{p_1, p_2, \ldots, p_n\}$ with $p_i=(x_i, y_i, z_i)^T$, calculate the mean $\mu$ and covariance $\Sigma$ of the Gaussian distribution by $$\mu = \frac{1}{n}(p_1 + p_2 + \ldots + p_n),$$

$$\Sigma = \frac{1}{n-1}\sum_{i=1}^{n}(p_i - \mu)(p_i - \mu)^T$$

for each higher layer of the hierarchical grids, calculate the Gaussian distribution for points in a cell of the higher layer by minimizing the sum of L2 distances between the Gaussian distribution for points in the cell of the higher layer with the Gaussian distribution for points in each child cell of the cell in the lower layer adjacent to the higher layer, where $L2=N(0|\mu_F-\mu_{ci}, \Sigma_F+\Sigma_{ci})$ wherein $\mu_F$ and $\Sigma_F$ are the mean and the covariance of the Gaussian distribution for the cell of the higher layer, respectively, $\mu_{ci}$ and $\Sigma_{ci}$ are the mean and the covariance of the Gaussian distribution for the ith child cell of the cell.

13. A system for representing environmental elements, comprising:
a sensor configured to detect at least an environmental element and to output scan data comprising at least a point cloud; and
an apparatus configured to represent environmental elements, the apparatus comprising:
a scan data receive module configured to receive scan data comprising at least a point cloud representing at least an environmental element from a sensor,
a point cloud segment module configured to segment the point cloud into point clusters using a region growing algorithm with a predetermined criterion of smooth,
a hierarchical grids partition module configured to partition the point clusters into hierarchical grids,
a Gaussian distribution establish module configured to establish a Gaussian distribution for points in each cell of each of the hierarchical grids, and
a Gaussian Mixture Model construct module configured to construct a Gaussian Mixture Model based on the Gaussian distribution for representing the environmental element,
wherein the predetermined criterion of smooth is derived by:
for each point of the point cloud, getting its neighboring points;
transforming the neighboring points into a local operation plane;
for each point of the point cloud, calculating principal curvatures of the local surface;
calculating surface curvature at one point of the point cloud to the direction of another point of the point cloud, surface curvature at the another point to the direction of the one point, and torsion of surface from the one point to the direction of the another point; and
establishing the predetermined criterion of smooth as the absolute value of the surface curvature at the one point to the direction of the another point being smaller than a threshold, the absolute value of the surface curvature at the another point to the direction of the one point being smaller than a threshold, and the absolute value of the torsion of surface from the one point to the direction of the another point being smaller than a threshold, and
wherein the surface curvature $K_{ij}$ at the one point $_Gp_i$ to the direction of the another point $_Gp_j$ is denoted as:

$$K_{ij} = \frac{d_{ij}^T}{\|d_{ij}\|}(v_{i1} v_{i2})H_i(v_{i1} v_{i2})^T \frac{d_{ij}}{\|d_{ij}\|},$$

the surface curvature $K_{ji}$ at the another point $_Gp_j$ to the direction of the one point $_GP_i$ is denoted as $$K_{ji} = \frac{d_{ij}^T}{\|d_{ij}\|}(v_{j1}v_{j2})H_j(v_{j1}v_{j2})^T \frac{d_{ij}}{\|d_{ij}\|},$$

and
the torsion of surface $T_{ij}$ from the one point $_GP_i$ to the direction of the another point $_Gp_j$ is denoted as $$T_{ji} = \frac{d_{ij}(d_{ij} \times v_{i3})}{\|d_{ij}\|\|d_{ij} \times v_{i3}\|},$$

where $d_{ij}$ represents the vector at the one point $_GP_i$ to the another point $_Gp_j$, $v_{i1}$, $v_{i2}$, $v_{i3}$ are the column vectors of the rotation matrix from the original point cloud coordinate system to the local operation plane coordinate system related to the one point, $_Gp_i$, $v_{j1}$, $v_{j2}$, $v_{j3}$ are the column vectors of the rotation matrix from the original point cloud coordinate system to the local operation plane coordinate system related to the another point $_Gp_j$, $H_i$ is the Hessian Matrix related to the one point $_Gp_i$, and $H_j$ is the Hessian Matrix related to the another point $_Gp_j$.

\* \* \* \* \*